C. G. DE LAVAL & R. HEIMBECKER.
COMPOUND METER.
APPLICATION FILED AUG. 12, 1915.
1,251,484. Patented Jan. 1, 1918.
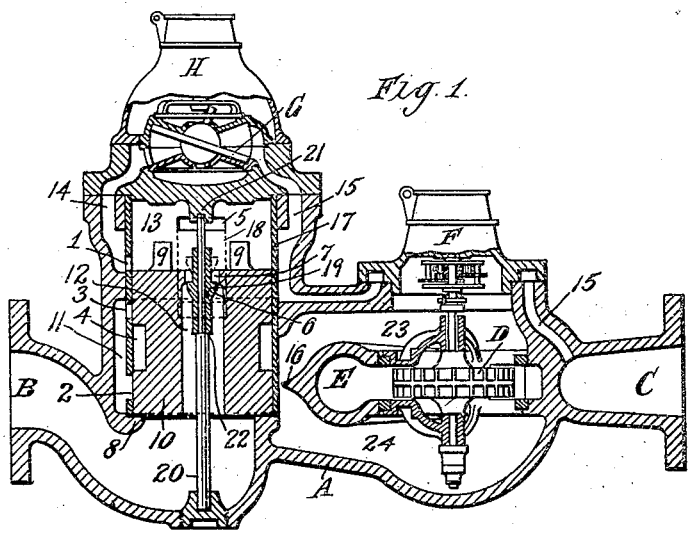
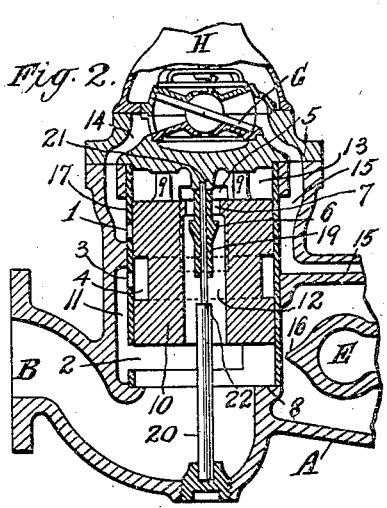
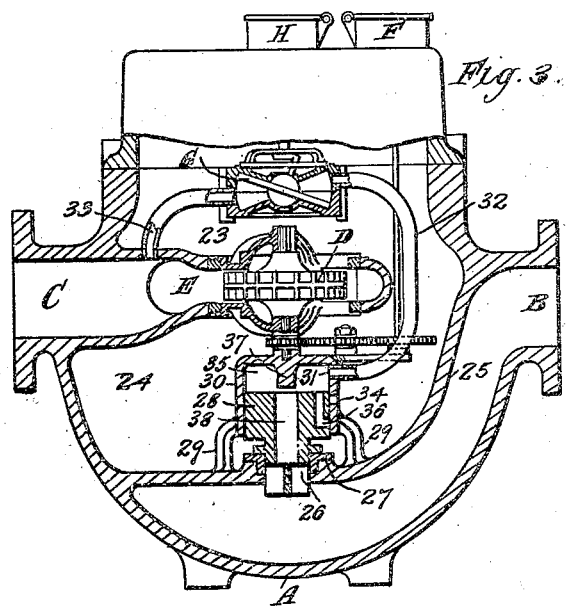
Inventors:
Carl George de Laval & Roland Heimbecker
by their Attys:

UNITED STATES PATENT OFFICE.

CARL GEORGE DE LAVAL, OF ORANGE, NEW JERSEY, AND ROLAND HEIMBECKER, OF NEW YORK, N. Y., ASSIGNORS TO HENRY R. WORTHINGTON, A CORPORATION OF NEW JERSEY.

COMPOUND METER.

1,251,484. Specification of Letters Patent. Patented Jan. 1, 1918.

Application filed August 12, 1915. Serial No. 45,148.

*To all whom it may concern:*

Be it known that we, CARL GEORGE DE LAVAL a citizen of the United States, residing at Orange, county of Essex, and State of New Jersey, and ROLAND HEIMBECKER, a citizen of the United States, residing at New York city, county and State of New York, have invented new and useful Improvements in Compound Meters, fully described and represented in the following specification and the accompanying drawings, forming a part of the same.

The object of this invention is to provide a simple and efficient meter of the compound type, that is provided with two metering devices, one for small flows or low duty, and the other for relatively large flows or high duty, with valve mechanism operated by fluid pressure to change the flow from one to the other of the metering devices.

The special object of this invention is to provide a change valve mechanism in which the change from low duty to high duty registration and vice versa shall be secured by a quick throw of the valve so as to produce a full opening of the high duty port immediately on the change to high duty. A further object is to provide efficient means for preventing flow through the low duty meter when the flow would not be sufficient to operate the latter, so that water shall not pass through the system without metering.

For a full understanding of the invention a detailed description of constructions embodying the same in preferred forms will now be given in connection with the accompanying drawing forming a part of this specification, and the features forming the invention then specifically pointed out in the claims.

In the drawings—

Figure 1 is a central section through a water meter showing the parts in the position of no water passing through the meter;

Fig. 2 is a similar partial view showing the valve body and its parts in the position of high duty flow.

Fig. 3 is a central section through a compound meter of another form embodying the broader features of the invention.

In the drawing A is a meter casing having inlet B and outlet C. The high duty meter is shown as a turbine meter D of substantially the same construction as shown in United States patent to Sims, No. 1,133,408, dated March 30, 1915, this turbine meter having delivery volute E and registering mechanism F. The turbine meter D is shown as on the discharge side of change valve 10, the water passing from the inlet B, when the valve is in high duty position as shown in Fig. 2, through port 2 and passage 11, to chambers 23 and 24 above and below the turbine wheel and thence to the turbine wheel. The low duty meter G is shown as a disk meter of common type having the usual registering mechanism H, the fluid to be metered passing from the inlet B through passage 12 in the change valve 10 to the chamber 13, thence through port 1 in cylinder 17 and passage 14 to the disk meter, and through passage 15 formed in the wall of the casing and cover to the outlet C.

Referring now to the change valve mechanism, the change valve 10 is a piston valve moving in the cylinder 17 shown as a separate cylinder within the casing wall, and preferably being of heavy bronze to avoid distortion. The fluid from the inlet B flows to the underside of the change valve 10 so that practically the full area of the valve is exposed to fluid pressure, and the valve is so proportioned as to weight as to secure the action desired. The cylinder 17 has ports 2 and 3 through which fluid passes to the high duty meter during high duty operation, port 2 communicating with the inlet through the cylinder 17 below the change valve 10, as shown in Fig. 2, and with the chambers 23, 24, above and below the high duty meter through annular passage 11. Port 3 communicates through annular passage 4 extending around the change valve, passage 18 cored in the casing and relief port 5 with the chamber 13 above the change valve 10. Cylinder 17 also has low duty port 1 communicating with the inlet B through chamber 13 above the change valve 10 and passage 12 in the change valve, this passage being controlled by a small pressure controlled valve 19, movably mounted upon stem 20, and limited in its upward movement by an abutment 21 formed in the top wall of the valve casing and in its downward movement by a shoulder 22 on the stem 20. Communication between the disk meter G and the low duty port 1 is established by the passage 14. Valve 19 is formed with a coned head or valve portion 6 adapted to coact with a reduced portion 7 of the passage 12 so that in the lowest position of the valve 19 the flow to the low duty meter will be cut off. In its lowest position the change valve 10 seats upon a shoulder 8 formed in the casing and in its movement upward is limited by stops 9 on the top of valve 10 striking the top of the valve casing.

Fig. 3 shows a modified construction embodying the broader features of the invention. A wall 25 divides the meter casing into two chambers and acts as a support for the change valve mechanism. This wall 25 has a port 26 therein provided with a valve seat 27 upon which the change valve 28 seats. Spiders 29 sustain the cylinder 30 which is open at the bottom and closed at the top. In this cylinder are located two ports, low duty port 31 leading through pipe 32 to the low duty meter G and port 34 being the relief port for the space 35 above the change valve 28. In this construction the passage for the relief of the chamber above the change valve is shown at 36 as in the change valve 28. A coned valve 37 is carried by the top of the cylinder 30 and located to enter and gradually close the passage 38 through the change valve 28 as the change valve rises.

The operation of the construction shown in Figs. 1 and 2 is as follows:

In the normal operation of the construction, that is in metering small flows or on low duty, the fluid passes through inlet B, thence through passage 12 in the change valve, raising the valve 19 to the position shown in dotted lines in Fig. 1, and thus to the chamber 13 above the change valve. Thence it passes through the port 1 to passage 14 and the disk meter G, and out to the discharge C by passage 15. When high duty pressure is reached, the valve 10 is raised from its seat, closing off the low duty port 1 and opening the high duty port 2 as soon as the low duty port is closed. As the valve 10 approaches this position the passage 12 in the center of the valve 10 leading to the chamber 13 is gradually closed by the valve 19, and annular passage 4 is raised to open communication between port 3 and the cored passage 18. Upon the alinement of annular passage 4 with port 3 and passage 18 there is instant relief of the pressure above the valve 10, which results in a quick throw of the valve to fully open the high duty port immediately on the closing of the low duty port. During high duty operation the fluid passes through port 2 into annular passage 11 extending around the cylinder and divided by rib 16 on the high duty meter volute, so as to deliver upward and downward into chambers 23 and 24 on opposite sides of the high duty wheel, through the turbine D and volute E out to the discharge C. During the quick throw of the change valve 10, the reduced portion 7 of the passage 12 passes the valve 19, thus opening passage 12 to the chamber 13; and the pressure in chamber 13 upon the top of the valve 10 is that of the high duty meter during high duty operation, so that the valve is partially balanced and there is very little loss of head due to the holding of the change valve up during the operation of the high duty meter. When the flow and pressure are reduced, so that the pressure is not sufficient to hold the valve 10 raised, the valve 10 falls by its weight and in its falling movement first closes port 2, and at the same time closes port 3 and passage 7, thus closing the relief from chamber 13 and the valve 10 then opens port 1 for low duty operation by a quick throw of the valve.

The operation of the construction shown in Fig. 3 is as follows:

The normal or low duty flow is through passage 38 in the change valve 28 to chamber 35, and thence to the low duty meter by means of pipe 32. On high duty the fluid passes through port 26 directly to the chambers 23 and 24 above and below the turbine meter D.

In changing from low to high duty the change valve 28 is raised by fluid pressure and, before the opening of high duty port 26, the coned valve 37 enters the passage 38 and shuts off communication between chamber 35 and the inlet, so as to cut the low duty meter out of operation. On the complete closure of the passage 38 passage 36 is put into communication with relief port 34, thereby relieving chamber 35 and giving the change valve 28 a quick throw to open port 26 to its full capacity, and this passage 36 is open through port 34 to chamber 24 during high duty operation.

It will be understood that the invention is not limited to the specific forms of apparatus shown and described, but that changes and variations may be made in the same while retaining the invention defined by the claims.

What is claimed is:

1. The combination, with meters for registering large and small flows, of a pressure controlled change valve to direct the flow to one meter or the other and having a passage through said valve, and a second pressure controlled valve movably mounted in said passage and adapted to close said passage upon decrease in pressure to a point below that required to operate said low duty meter and operated to open the passage for low duty operation upon increase of pressure.

2. The combination, with meters for registering large and small flows, of a pressure controlled change valve to direct the flow to one meter or the other and having a passage through said valve and a second pressure controlled valve movably mounted in said passage and adapted to close said passage upon decrease in pressure to a point below that required to operate said low duty meter and operated to open the passage for low duty operation upon increase of pressure and coacting with the change valve to close the passage upon movement of the change valve for high duty operation.

3. In a change valve mechanism for compound meters, the combination, with a cylinder having high and low duty ports and a relief port, of a change valve therein controlled by the fluid pressure and adapted to direct the flow to the high duty meter or the low duty meter as required, said cylinder forming a chamber above said change valve having a port, the cylinder and change valve having passages connecting said port with the said relief port upon the closing of the low duty port and the opening of the high duty port, whereby the pressure in said chamber is relieved and a quick throw of the change valve secured to open the high duty port fully.

4. The combination, with meters for registering large and small flows, of a change valve mechanism comprising a cylinder and a change valve body therein controlled by the pressure and operating to change the flow from one meter to the other, said cylinder having ports controlled by said valve for change from low duty to high duty and vice versa, said cylinder forming a pressure chamber above said change valve and said cylinder having ports controlled by said change valve for relieving the pressure in said chamber to produce a quick throw of the valve body upon the full closure of the low duty port, whereby the high duty port is quickly opened to its full capacity.

5. In a change valve mechanism for compound meters, the combination, with a cylinder closed at its upper end and having a low duty port and a relief port, a change valve therein controlled by pressure and having a passage connecting the upper end of the cylinder with the inlet side of said change valve, a valve adapted to close said passage on the movement of the change valve for high duty operation and means controlled by the change valve for opening the upper end of the cylinder to high duty pressure during high duty operation.

6. The combination, with meters D and G for registering large and small flows, of cylinder 17 having low duty port 1, high duty port 2 and relief ports 5 and 3, change valve 10 controlling said ports and having central passage 12, chamber 13 above said change valve 10, valve 19 movably mounted in said passage 12, and having shoulder 6 adapted to close the passage 12, passage 18 connected with relief port 5, and annular passage 4 in the change valve 10 adapted to connect the lower portion of said passage 18 with relief port 3.

7. In a change valve mechanism for compound meters, the combination, with cylinder 17 having low duty port 1, high duty port 2 and relief ports 3 and 5, passage 18 cored in the casing wall, one end thereof connecting with relief port 5, of change valve 10 therein controlled by fluid pressure and having an annular passage 4 adapted to connect relief port 3 with the lower end of said cored passage 18, chamber 13 above said relief valve 10, passage 12 through said change valve 10, and valve 19 slidably mounted within said passage.

In testimony whereof we have hereunto set our hands.

CARL GEORGE DE LAVAL.
ROLAND HEIMBECKER.

Copies of this patent may be obtained for five cents each, by addressing the "Commissioner of Patents, Washington, D. C."